United States Patent
Stege et al.

(10) Patent No.: US 11,067,058 B2
(45) Date of Patent: Jul. 20, 2021

(54) METHOD OF APPLYING A PROTECTIVE LAYER TO A WIND TURBINE ROTOR BLADE

(71) Applicant: Siemens Gamesa Renewable Energy A/S, Brande (DK)

(72) Inventors: Jason Stege, Brande (DK); Kasper Koops Kratmann, Horsens (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 17 days.

(21) Appl. No.: 16/469,459

(22) PCT Filed: Nov. 9, 2017

(86) PCT No.: PCT/EP2017/078691
§ 371 (c)(1),
(2) Date: Jun. 13, 2019

(87) PCT Pub. No.: WO2018/114123
PCT Pub. Date: Jun. 28, 2018

(65) Prior Publication Data
US 2020/0040869 A1 Feb. 6, 2020

(30) Foreign Application Priority Data
Dec. 21, 2016 (DE) ............... 10 2016 225 895.8

(51) Int. Cl.
*F03D 1/06* (2006.01)
*B32B 7/12* (2006.01)
(Continued)

(52) U.S. Cl.
CPC ............ *F03D 1/0675* (2013.01); *B32B 3/30* (2013.01); *B32B 7/12* (2013.01); *B32B 37/1009* (2013.01);
(Continued)

(58) Field of Classification Search
CPC combination set(s) only.
See application file for complete search history.

(56) References Cited

U.S. PATENT DOCUMENTS 5,464,337 A * 11/1995 Bernardon ............ B29C 33/302
264/257
8,603,628 B2 * 12/2013 Verma .................... F03D 1/065
428/343
(Continued)

FOREIGN PATENT DOCUMENTS

CN 102619676 A 8/2012
DE 2424085 A1 12/1974
(Continued)

OTHER PUBLICATIONS

Non-English Chinese Office Action for Application No. 201780079820.6, dated Mar. 18, 2020.
(Continued)

*Primary Examiner* — Igor Kershteyn
(74) *Attorney, Agent, or Firm* — Schmeiser, Olsen & Watts LLP

(57) ABSTRACT

Provided is a method of applying a protective layer to an outer surfaced of a wind turbine rotor blade, which method includes the steps of preparing a protective layer for application to the outer surface of the rotor blade; providing an air exit channel between the rotor blade and the protective layer; attaching the protective layer to the outer surface of the rotor blade; and extracting air through the air exit channel. Further provided is a wind turbine rotor blade including a protective layer applied to an outer surface of the rotor blade using such a method.

20 Claims, 4 Drawing Sheets

(51) Int. Cl.
 B32B 37/12 (2006.01)
 B32B 37/10 (2006.01)
 B32B 37/18 (2006.01)
 B32B 3/30 (2006.01)
(52) U.S. Cl.
 CPC ........ *B32B 37/1207* (2013.01); *B32B 37/182* (2013.01); *B32B 2603/00* (2013.01)

(56) References Cited

U.S. PATENT DOCUMENTS

| | | | |
|---|---|---|---|
| 2003/0116262 A1* | 6/2003 | Stiesdal | B29D 99/0028 156/245 |
| 2006/0034971 A1* | 2/2006 | Olsen | F03D 1/065 425/451.5 |
| 2011/0097211 A1 | 4/2011 | Rudling | |
| 2011/0243751 A1 | 10/2011 | Fritz et al. | |
| 2012/0312469 A1 | 12/2012 | Stiesdal | |
| 2015/0166748 A1 | 6/2015 | Schibsbye | |

FOREIGN PATENT DOCUMENTS

| | | |
|---|---|---|
| DE | 60311580 T2 | 10/2007 |
| DE | 202009006966 U1 | 9/2010 |
| DE | 102011055478 A1 | 5/2012 |
| WO | 2010057502 A2 | 5/2010 |

OTHER PUBLICATIONS

German Exam Report for Application No. 10 2016 225 895.8, dated Oct. 26, 2017.
PCT International Search Report for International Application No. PCT/EP2017/078691, dated Feb. 7, 2018.

* cited by examiner

METHOD OF APPLYING A PROTECTIVE LAYER TO A WIND TURBINE ROTOR BLADE

CROSS-REFERENCE TO RELATED APPLICATIONS

This application claims priority to PCT Application No. PCT/EP2017/078691, having a filing date of Nov. 9, 2017, which is based off of DE Application No. 10 2016 225 895.8, having a filing date of Dec. 21, 2016, the entire contents both of which are hereby incorporated by reference.

FIELD OF TECHNOLOGY

The following describes a method of applying a protective layer to a wind turbine rotor blade; the following further describes a wind turbine rotor blade with a protective layer.

BACKGROUND

The outer surface of a wind turbine rotor blade is exposed to harsh environmental conditions arising from extreme temperatures, the build-up of ice, impact and erosion by hail and sleet, etc. The leading edge of a rotor blade is particularly vulnerable to damage—the rotor blades of a large wind turbine can have lengths in the region of 45-75 meters, and the velocity at an outer region of the blade can be very high, so that the likelihood of damage to the leading edge is greater with increasing distance toward the blade tip. Damage to the outer surface of the blade may manifest as a crack in an outer layer, through which moisture can enter. Even minor damage can develop or propagate into a more serious defect, so that erosion damage to the blade must be repaired. Any such repair procedure can be costly, particularly in the case of an offshore wind turbine. Furthermore, the wind turbine must be halted while repair procedures are carried out.

For this reason, some measures may be taken to protect the blade outer surface, particularly in the more vulnerable regions. For example, a protective cover may be applied over some region of the blade. Such a protective cover may be a pre-cast or molded part that is glued onto the blade, or may comprise a film or sheet of a durable material. However, when mounting such a protective layer onto the surface of a blade, pockets of air (referred to as "voids") may be trapped between the blade outer surface and the inside surface of the protective layer. At an air pocket or void, there is no adhesion between these surfaces. Such voids can act as failure initiators. Temperature variations can cause the air in the void to expand or contract, so that the protective cover may crack or propagate further delamination. Any moisture entering the void will increase the damage further, since ice expands on freezing. Moisture under a cracked outer surface may also attract a lightning strike, which can lead to serious damage to the blade.

SUMMARY

An aspect relates to provide an improved way of protecting the outer surface of a wind turbine rotor blade.

This aspect is achieved by the method of applying a protective layer to an outer surface of a wind turbine rotor blade; and by wind turbine rotor blade.

According to embodiments of the invention, the method of applying a protective layer to an outer surface of a wind turbine rotor blade comprises the steps of preparing a protective layer for application to the outer surface of the rotor blade; providing an air exit channel between the rotor blade and the protective layer; attaching the protective layer to the outer surface of the rotor blade; and extracting air through the air exit channel.

An advantage of the inventive method is that it is a cost-effective and straightforward way of providing a long-lasting and effective protection for the vulnerable outer surface of a rotor blade. By achieving a protective layer that is free of any voids or air inclusions, the function of the protective layer can be ensured for a favorably long duration.

According to embodiments of the invention, the wind turbine rotor blade comprising a protective layer applied to an outer surface of the rotor blade using the inventive method. An advantage of the inventive wind turbine rotor blade is that a vulnerable surface of the blade can be very effectively protected from damage without adding significantly to the manufacturing costs of the blade. The inventive method can be carried out in situ for an already installed wind turbine rotor blade and can be used to extend the lifetime of such a rotor blade. Of course, the method can be applied in the manufacture of a new rotor blade to achieve an extension of the blade's expected lifetime. The protective layer can be mounted to the blade after a painting step, and before the blade leaves the factory or manufacturing site.

In the following, without restricting embodiments of the invention in any way, it may be assumed that the wind turbine rotor blade comprises a root section, and an airfoil section that extends from the root section to the outer end of the blade. This outer blade region is generally referred to as the blade tip and is relatively flat. The airfoil section generally has a pronounced curvature to form a suction side and a pressure side as air passes over the blade. The inventive method can be used to apply a protective layer over any part of the outer surface of the blade, over any vulnerable surface region of the blade.

Blades of a wind turbine will rotate in one specific direction, and the leading edge of the blade "cuts" the air, while the trailing edge follows. It is the leading edge that is most vulnerable to damage or erosion caused by rain, ice, hail, sleet etc. Therefore, in an exemplary embodiment of the invention, the protective layer is applied over at least a portion of the leading edge. The protective layer is applied over the leading edge from the root end section of the rotor blade at least as far as the blade tip, any may also cover the leading edge in the blade tip region.

The protective layer is made by using a sheet or strip of a suitable material that is durable as well as flexible. A suitable material may be a viscoelastic polymer, usually referred to as an elastomer. Alternatively, a polyurethane material may be used, for example a thermosetting polymer, a thermoplastic polyurethane (TPU) or thermoplastic elastomer, etc. In the following, without restricting embodiments of the invention in any way, the protective layer may simply be referred to as a protective elastomer.

The protective layer can comprise one piece or may comprise several separate pieces referred to collectively as the protective layer in the following. For example, a protective layer for applying along the leading edge of a rotor blade may comprise one long rectangle. Alternatively, in the case of a relatively long rotor blade (45 m or more, for example), it may be exemplary to apply the protective layer in stages or sections, for example a series of abutting or overlapping sections or rectangles applied to the leading edge, whereby the sections can have a length of approximately 1 m. An essentially rectangle-shaped protective layer may be defined in terms of its two long edges and two short edges, whereby a long edge will lie essentially parallel to the leading edge.

The air can be extracted from between the protective layer and the blade surface using any appropriate technique. For example, in an exemplary embodiment of the invention, the air is sucked or drawn out from the air exit channel(s) using a vacuum pump. Such a vacuum pump can generate an under pressure or negative pressure in the region of −700 millibar, for example, which is sufficient to thoroughly extract any air from between the protective layer and the blade surface. In a particularly exemplary embodiment of the invention, a "vacuum blanket" is used, which can be realized to enclose the entire protective layer in place on the rotor blade. Such a vacuum blanket comprises a seal arrangement around its outer perimeter, and a number of vacuum flow channels for connection to a vacuum pump.

The protective layer may be secured or permanently fastened to the blade in any suitable manner. In a particularly exemplary embodiment of the invention, the method comprises the step of applying an adhesive layer or film, such as a thermolatent reactive film, to the inside surface of the protective layer as part of the preparation step. Alternatively, or in addition, an adhesive film may be applied to a corresponding region on the outer surface of the rotor blade. A thermolatent reactive film is thermosetting and has adhesive properties, and in the following, the terms "thermolatent reactive film" and "thermolatent adhesive" may be used interchangeably. A thermolatent adhesive film may have been previously painted in a hot state onto the outside surface of the blade or onto the inside surface of the protective layer. Alternatively, a thermolatent adhesive film may be provided as a thin sheet, which is spot-welded in place (onto the inside surface of the protective layer, or onto the outside surface of the blade, so that it does not slip during the air extraction process. After the vacuum extraction process is completed to extract air that may have been trapped between the protective layer and the blade surface, a heating process is initiated to activate the thermolatent adhesive. In this way, a permanently void-free bond is achieved between the protective layer and the blade surface.

Voids or air pockets can appear anywhere between a protective layer and the surface to which it is applied. Therefore, in a particularly exemplary embodiment of the invention, an air exit channel extends from one edge of the protective layer to another edge of the protective layer. This provides the air from a void with an unbroken passage or channel to an edge of the protective layer. In this way, air can pass from a void to the outside. An air exit channel can extend diagonally from one edge of the protective layer to another edge, or may extend at right angles between opposite edges of the protective layer.

An air exit channel can be created in a number of ways. For example, in one exemplary embodiment of the invention, an air exit channel is formed by a breather material arranged between the protective layer and the rotor blade surface. For example, a strip of breather material can be arranged to extend from one long edge of the protective layer to the opposite long edge. Such a strip of breather material can be arranged to extend at right angles to the long edges, for example, or may extend diagonally from one edge to another.

Alternatively or in addition, an air exit channel can be provided by arranging a cord or "beading" between the protective layer and the rotor blade surface, so that a cavity is initially present alongside the cord on either side. Air can be extracted through these channels, which will be closed again when the process is complete, for example during a step of melting a thermolatent adhesive film already in place between the protective layer and the rotor blade surface. After the air extraction step, the thermoplastic film is heated to melt it, whereby the melted glue flows to completely fill any space along the edges of the cord.

Alternatively or in addition, an air exit channel can be provided by forming one or more grooves or recesses along the inside surface. For example, a V-shaped channel could be excised from the body of the protective layer, or the protective layer is molded to already include an arrangement of grooves or channels. The step of preparing the protective layer comprises forming a plurality of such grooves or channels in the body of the protective layer. For example, a dense pattern of intersecting grooves could be formed in a central region of the protective layer, while a less dense arrangement of outwardly extending grooves or channels might connect the densely intersecting grooves to the outer edges of the protective layer. With such an arrangement of grooves, the likelihood of any void remaining between the protective layer and the blade is extremely low or even negligible. This approach is particularly exemplary, since it is favorably cheap and straightforward to implement.

Alternatively or in addition, an air exit channel can be provided by arranging a fold in a thermolatent adhesive film that will later be used to bond the protective layer to the rotor blade. The fold can be achieved folding the thermoplastic film back onto itself, first in one direction, and then once again in the opposite direction. The fold will therefore comprise three layers of the thermoplastic film, which create air channels running the length of the fold. Air can be drawn out through the channels in the fold. After the air extraction step, the thermoplastic film is heated to melt it, whereby the thickness of the fold will reduce significantly.

As indicated above, the protective layer can be an elastomer, and can be provided as a flexible sheet which can adapt to the curved surface of the leading edge. Alternatively, if a different kind of material is used, the step of preparing the protective layer may comprise a step of pre-forming the protective layer according to the corresponding shape of the outer surface of the rotor blade.

BRIEF DESCRIPTION

Some of the embodiments will be described in detail, with reference to the following figures, wherein like designations denote like members, wherein.

In the diagrams, like numbers refer to like objects throughout. Objects in the diagrams are not necessarily drawn to scale.

DETAILED DESCRIPTION

Figure 1A:
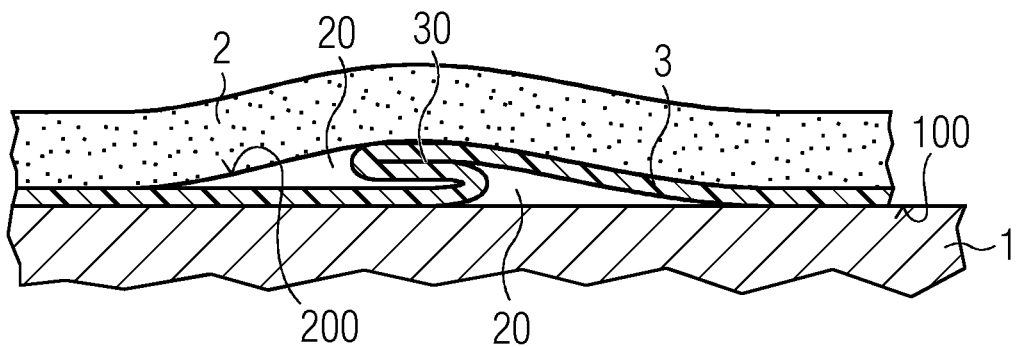
FIG. 1A illustrates in a first embodiment a thermolatent adhesive film is prepared by forming a fold.
Figure 1B:
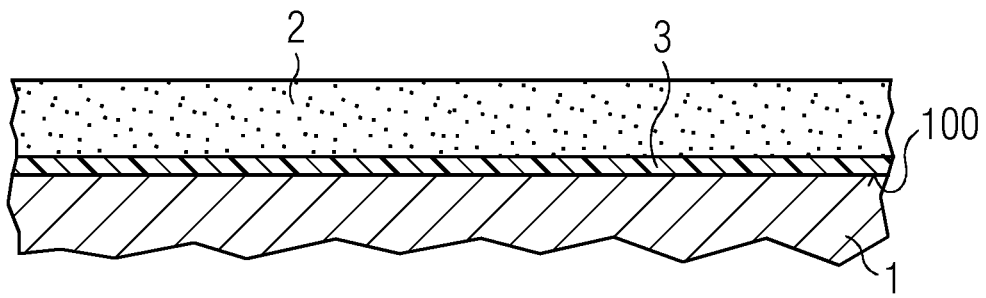
FIG. 1B illustrates a first embodiment of the inventive method.

FIGS. 1A and 1B illustrate a first embodiment of the inventive method. In this embodiment, a thermolatent adhesive film 3 is prepared by forming a fold 30 as indicated in FIG. 1A. The fold 30 can be arranged to lie along the leading edge of a rotor blade 1 (for the sake of simplicity, this drawing and the following two drawings show a flat blade surface, but of course the blade surface is curved in the leading edge region shown in the other diagrams). A protective layer 2 such as a rectangular sheet of an elastomer material 2 is then placed over the thermolatent adhesive film 3. Cavities 20 remain between the inside surface 200 of the protective layer 2 and the thermolatent adhesive film 3, and act as channels 20 through which any remaining air can be extracted. Vacuum extraction can then be performed using any suitable apparatus to draw out or extract air through the channels 20. Heat is applied to melt the thermolatent adhesive film 3, which then softens to completely fill the interface between the protective layer 2 and the blade 1, as indicated in FIG. 1B. The heat can be applied after the vacuum extraction is completed, or simultaneously. For example, heat can be applied so that a central area of the thermolatent adhesive film 3 is heated first, allowing air to be extracted through channels opening onto the outer edges of the protective layer 2, and then applying heat to the rest of the thermolatent adhesive film 3.

Figure 2A:
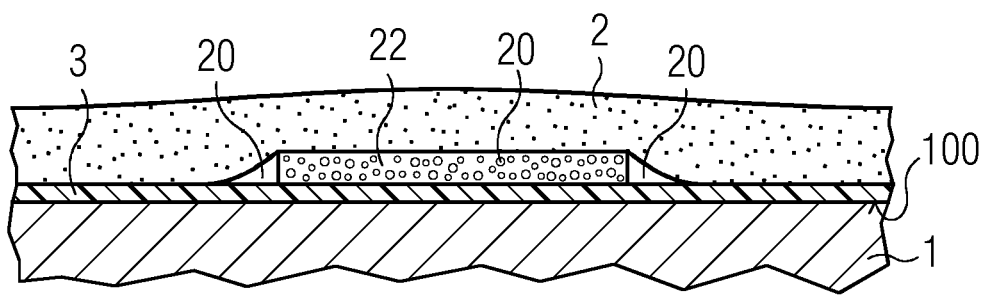
FIG. 2A illustrates a second embodiment of the inventive method a strip of breather material is arranged between the protective layer.
Figure 2B:
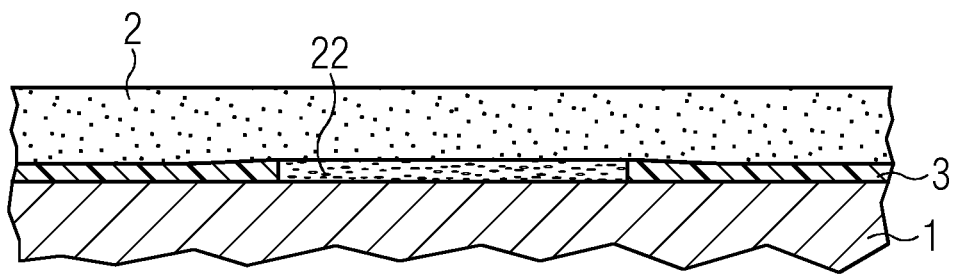
FIG. 2B illustrates a second embodiment of the inventive method.

FIGS. 2A and 2B illustrate a second embodiment of the inventive method. In this embodiment, a strip of breather material 22 is arranged between the protective layer 2 and a layer of thermolatent adhesive 3 that has been applied to the blade outer surface 100. In this case also, the breather 22 can be arranged to lie along the leading edge of a rotor blade 1. The breather 22 itself acts as a channel 20 through which any remaining air can be extracted. Vacuum extraction can then be performed using any suitable apparatus to draw out or extract air through the breather 22. A vacuum or underpressure will "flatten" the breather 22 to some extent. Heat is applied to melt the thermolatent adhesive film 3 as described above, in order to completely fill the interface between the protective layer 2 and the blade 1, as indicated in FIG. 2B.

Figure 3A:
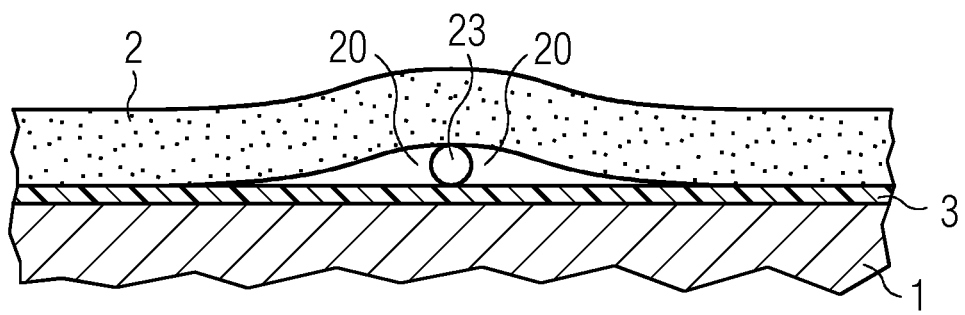
FIG. 3A illustrates a third embodiment of the inventive method.
Figure 3B:
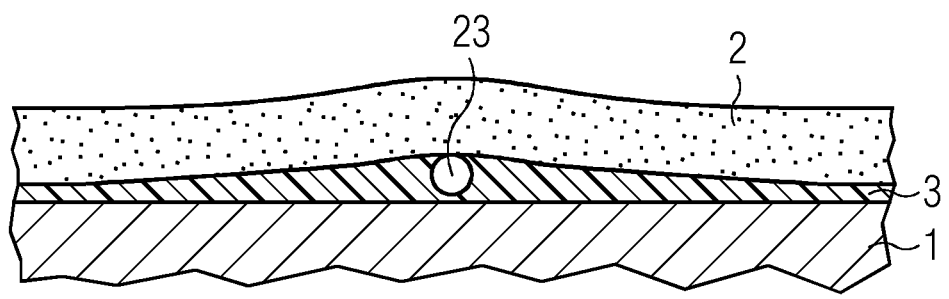
FIG. 3B illustrates a third embodiment of the inventive method.

FIGS. 3A and 3B illustrate a third embodiment of the inventive method. In this embodiment, a long thin bead 23 or thin cord 23 is arranged between the protective layer 2 and a layer of thermolatent adhesive 3 that has been applied to the blade outer surface 100. In this case also, the bead 23 can be arranged to lie along the leading edge of a rotor blade 1. Spaces on either side of the bead 23 act as channels 20 through which any remaining air can be extracted. Vacuum extraction can then be performed using any suitable apparatus to draw out or extract air through the channels 20. Heat is applied to melt the thermolatent adhesive film 3 as described above, in order to completely fill the interface between the protective layer 2 and the blade 1, as indicated in FIG. 3B.

Figure 4A:
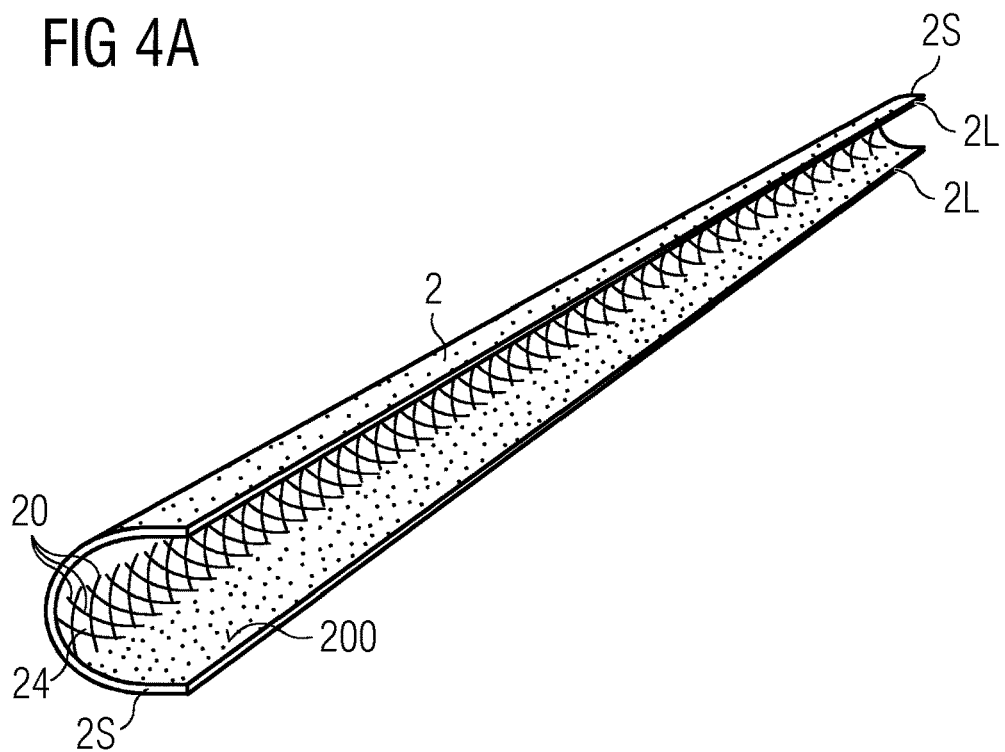
FIG. 4A illustrates a fourth embodiment of the inventive method.
Figure 4B:
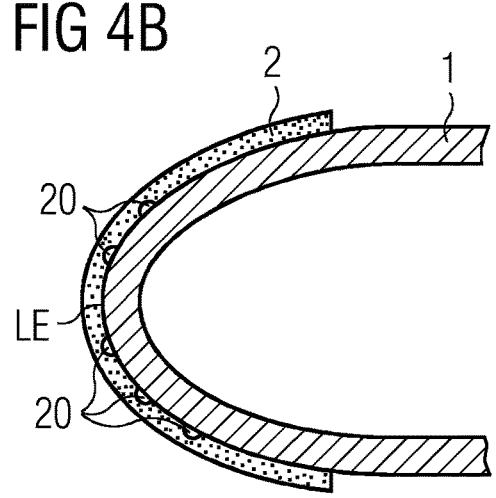
FIG. 4B illustrates a fourth embodiment of the inventive method.
Figure 4C:
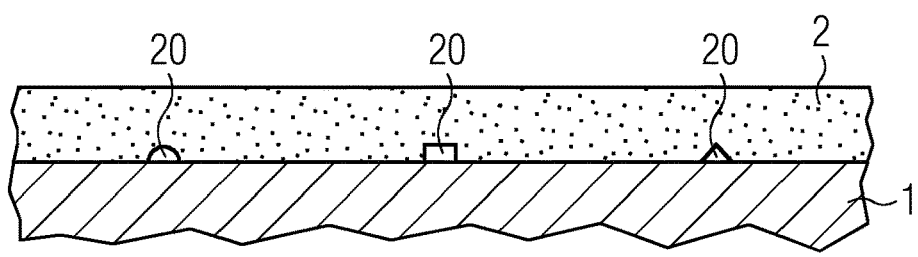
FIG. 4C illustrates a fourth embodiment of the inventive method.

FIGS. 4A 4C illustrate a fourth embodiment of the inventive method. FIG. 4A and FIG. 4B indicate the curved shape in the leading-edge region of a wind turbine rotor blade 1. In this embodiment, a pattern 24 of grooves or channels 20 has been made on the inside surface of an elongate rectangular elastomer sheet 2 which will act as a protective layer 2. FIGS. 4A and 4B show the elastomer sheet 2 and the location of the channel pattern 24 in relation to the leading edge LE of the blade 1. The pattern of grooves 24 acts as multiple channels 20 through which air can be extracted. Vacuum extraction can then be performed using any suitable apparatus to draw out or extract air through the channels 20. In this embodiment, the channels 20 open onto the short outer edges 2S of the elastomer sheet 2. Equally, channels 20 could (also) be formed to open onto the long outer edges 2L of the elastomer sheet 2. The thickness of the elastomer sheet 2—especially at the outer edges 2S, 2L—is greatly exaggerated in the diagrams, and the elastomer sheet 2 can of course be significantly thinner at the outer edges 2S, 2L to give a smooth transition onto the surface of the blade 1. Although not shown in these diagrams, a layer of thermolatent adhesive film 3 may be arranged between the elastomer sheet 2 and the blade 1. After (or during) the air extraction step, heat can be applied to melt such a thermolatent adhesive film 3 as described above, in order to completely fill the interface between the protective layer 2 and the blade 1. FIG. 4C shows a close-up of the junction between the protective layer 2 and the blade 1 and indicates the different shapes of channel 20 that may be formed in an elastomer sheet 2 (or any other suitable material). The channels 20 may arise during manufacture of the protective layer 2 (for example in an extrusion process) or may be formed by excising material from an existing protective layer 2.

Figure 5:
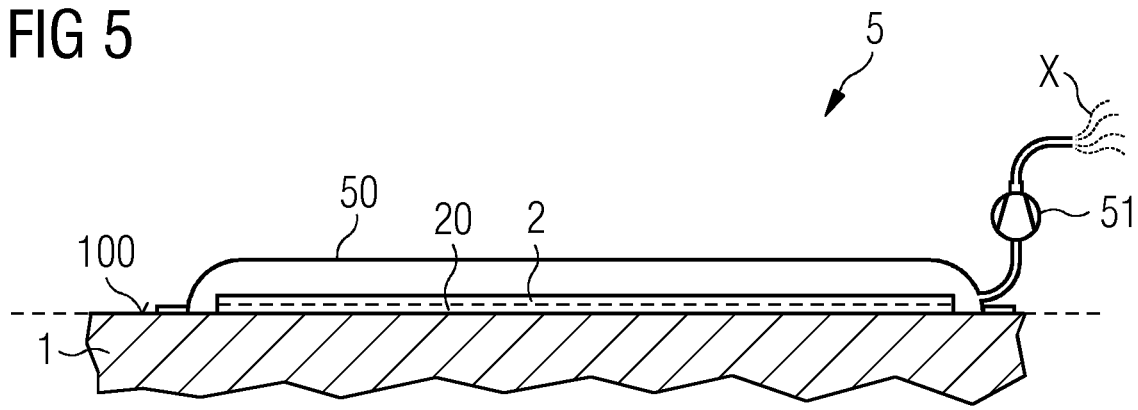
FIG. 5 illustrates a vacuum extraction step of the inventive method.

FIG. 5 illustrates a vacuum extraction step of the inventive method. Here, a vacuum bag is secured onto the surface 100 of the blade 1 to completely enclose a protective layer 2. A vacuum pump 51 creates an underpressure to extract air X from the channels 20 (indicated by the dotted line) arising in any of the four embodiments described above.

Figure 6:
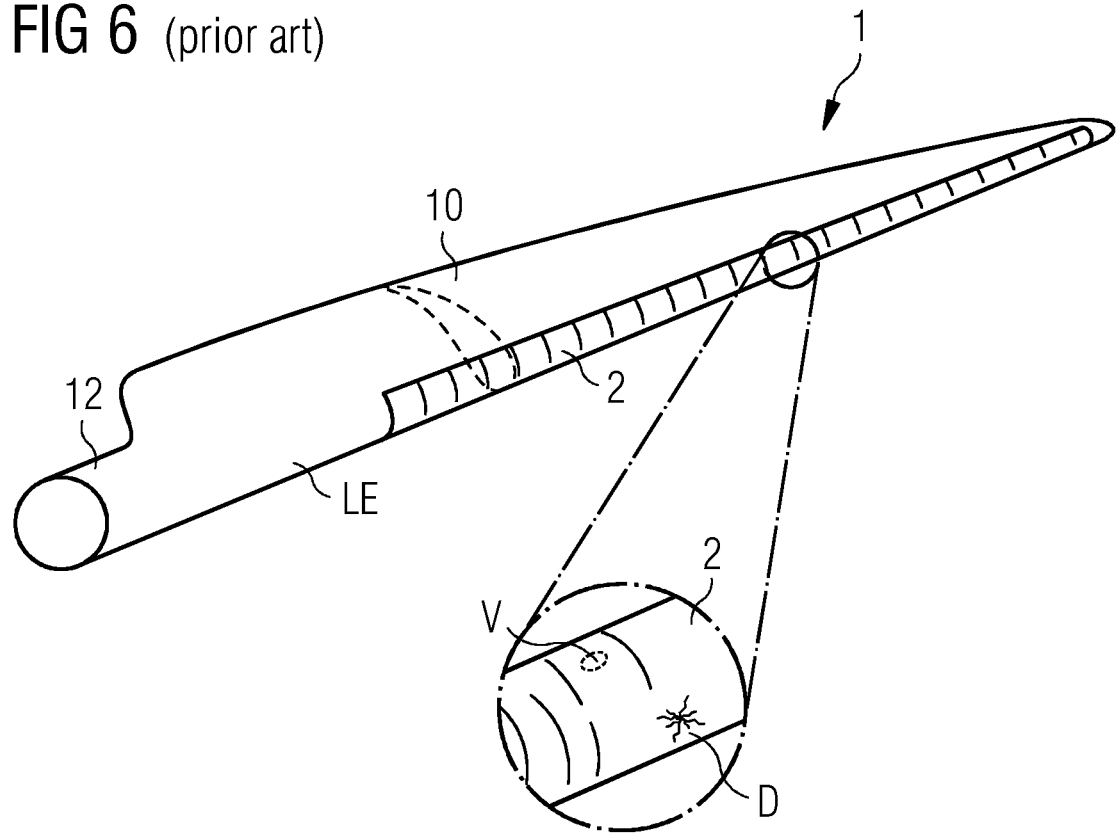
FIG. 6 shows damage to a known wind turbine rotor blade.

FIG. 6 shows a prior art wind turbine rotor blade 1. The main parts of the blade 1 are the airfoil section 10 with leading edge LE and blade tip 11, and a root section 12 for mounting to the hub of a wind turbine. The diagram also shows a protective layer 2 applied to the leading edge LE. This protective layer 2 should protect the surface of the leading edge LE of the blade 1 from erosion and impact damage. However, voids or air-pockets arising during application of the protective layer 2 may actually lead to damage. A void V (somewhat exaggerated in size) is indicated by the dotted line in the enlarged portion of the diagram. Even minor damage to the protective layer 2 can result in serious damage later on. An air-pocket V can expand and break open because of temperature variations. Moisture can then enter through the resulting lesion and then freeze, thereby expanding and giving rise to damage D in the form of a larger tear or crack in the protective layer 2, as indicated in the enlarged portion of the diagram. Voids V between the blade outer surface 100 and a protective layer 2 are therefore associated with failure initiation and failure propagation. A damaged region in the protective layer 2 effectively exposes the underlying blade surface to direct erosion damage and may also increase the likelihood of a lightning strike to that part of the blade.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The claims are as follows:

1. A method of applying a protective layer to an outer surface of a wind turbine rotor blade, which method comprises the steps of
    preparing a protective layer for application to the outer surface of the rotor blade;
    providing an air exit channel between the rotor blade and the protective layer;
    attaching the protective layer to the outer surface of the rotor blade; and
    extracting air through the air exit channel.

2. The method according to claim 1, wherein the air exit channel extends from one edge of the protective layer to an opposite edge of the protective layer.

3. The method according to claim 1, wherein the air exit channel is formed by a breather material arranged between the protective layer and the rotor blade surface.

4. The method according to claim 1, wherein the air exit channel is formed alongside a cord arranged between the protective layer and the rotor blade surface.

5. The method according to claim 1, wherein the air exit channel is formed by a groove along the inside surface of the protective layer.

6. The method according to claim 1, wherein the step of preparing the protective layer comprises a step of forming a plurality of grooves in the body of the protective layer.

7. The method according to claim 1, comprising the step of applying a thermolatent adhesive layer to the inside surface of the protective layer and/or to the outer surface of the rotor blade.

8. The method according to claim 1, wherein the air exit channel is formed by a fold in a thermolatent adhesive layer arranged between the protective layer and the rotor blade.

9. The method according to claim 7, wherein the step of extracting the air is accompanied by and/or followed by a step of heating the thermolatent adhesive layer.

10. The method according to claim 1, wherein air is extracted through the air exit channel by a vacuum pump.

11. The method according to claim 1, wherein the step of preparing the protective layer comprises a step of preforming the protective layer according to the shape of the rotor blade.

12. A wind turbine rotor blade comprising a protective layer applied to an outer surface of the rotor blade using the method according to claim 1.

13. The wind turbine rotor blade according to claim 12, comprising an airfoil section with a leading edge and a trailing edge, and wherein the protective layer is applied over at least a portion of the leading edge.

14. The wind turbine rotor blade according to claim 12, wherein the protective layer is applied over the leading edge from a root end section of the rotor blade to the outer end of the rotor blade.

15. The wind turbine rotor blade according to claim 12, wherein the protective layer comprises a viscoelastic polymer.

16. A method of applying a protective layer to a wind turbine rotor blade, the method comprising:
    preparing a protective layer for application to the rotor blade;
    applying a thermolatent adhesive layer to at least one of the protective layer and the rotor blade;
    providing an air exit channel between the rotor blade and the protective layer;
    attaching the protective layer to the rotor blade; and
    extracting air through the air exit channel.

17. The method according to claim 16, further comprising heating the thermolatent adhesive layer.

18. The method according to claim 17, wherein heating the thermolatent adhesive layer is performed at least one of simultaneously with and after extracting the air.

19. The method according to claim 17, wherein heating the thermolatent adhesive layer results in a melted thermolatent adhesive.

20. The method according to claim 19 wherein the melted thermolatent adhesive fills an interface between the protective layer and the rotor blade.

* * * * *